April 28, 1970     S. D. HOOPER     3,508,355

SLIDE HOLDER

Filed Oct. 6, 1967     3 Sheets-Sheet 1

INVENTOR.
STEPHEN D. HOOPER
HIS ATTORNEYS.

April 28, 1970　　　S. D. HOOPER　　　3,508,355
SLIDE HOLDER

Filed Oct. 6, 1967　　　　　　　　　　　3 Sheets-Sheet 2

INVENTOR.
STEPHEN D. HOOPER
HIS ATTORNEYS.

April 28, 1970   S. D. HOOPER   3,508,355
SLIDE HOLDER

Filed Oct. 6, 1967   3 Sheets-Sheet 3

INVENTOR.
STEPHEN D. HOOPER
BY Jumpston, Shaw
 Stephens
HIS ATTORNEYS.

United States Patent Office 3,508,355
Patented Apr. 28, 1970

3,508,355
SLIDE HOLDER
Stephen D. Hooper, Fairport, N.Y., assignor to Indemar, Inc., Rochester, N.Y., a corporation of New York
Filed Oct. 6, 1967, Ser. No. 673,509
Int. Cl. G09f 13/10
U.S. Cl. 40—106.1                        9 Claims

ABSTRACT OF THE DISCLOSURE

A slide holder has a flat base and transverse grooves arranged for holding slides upright at an angle away from a person viewing the slides. The upper surface of the base is bright white and diffusely reflects light to back light the slides for viewing and sorting. Also, the grooves can be formed in separate, pivotal members mounted on the base so that the slides can be laid flat for storage and raised upward to the appropriate angle for viewing. With such an arrangement, several base sheets of slides are preferably held in a ring notebook.

---

This invention relates to a slide holder, and more particularly to a photographic slide transparency holder arranged so that slides can be viewed and sorted by reflected light from the upper surface of the holder.

Many slide holders and sorters have been known in the prior art, but these have suffered various deficiencies. Many have included artificial light sources and translucent bases for passing light to the backs of slides for viewing, and all such devices have been generally complex, expensive, and inconvenient to use and maintain.

The objects of the invention include, without limitation, the following:

(a) Overcoming the deficiencies of prior art slide holders and sorters; and (b) Making a slide holder that is simple, inexpensive, compact, functionally convenient, and capable of using ambient light to illuminate slides for viewing and sorting.

These and other objects of the invention will be apparent hereinafter from the specification which describes the invention, its use, operation, and preferred embodiments, from the drawings, which constitute a part of the disclosure, and from the subject matter claimed.

Generally, the inventive slide holder is formed of a base with a bright white upper surface that diffusely reflects light and with spaced-apart, parallel grooves extending across the base for holding slides snugly in place at an appropriate acute angle from the perpendicular to the base for viewing and sorting by light reflected from the upper surface of the base. The base is preferably flat and made to rest on a flat surface, and the preferred viewing angle is between 15° and 50° from the perpendicular to the general plane of the base so that the slides uniformly slope away from the person viewing them. The base can also be a flat sheet bearing a pivotal groove member for holding slides so they can be raised to the appropriate viewing angle and turned down to a flat position parallel with the base for storage. With such an arrangement, several bases are preferably held like pages in a covered ring notebook.

Figure 1:
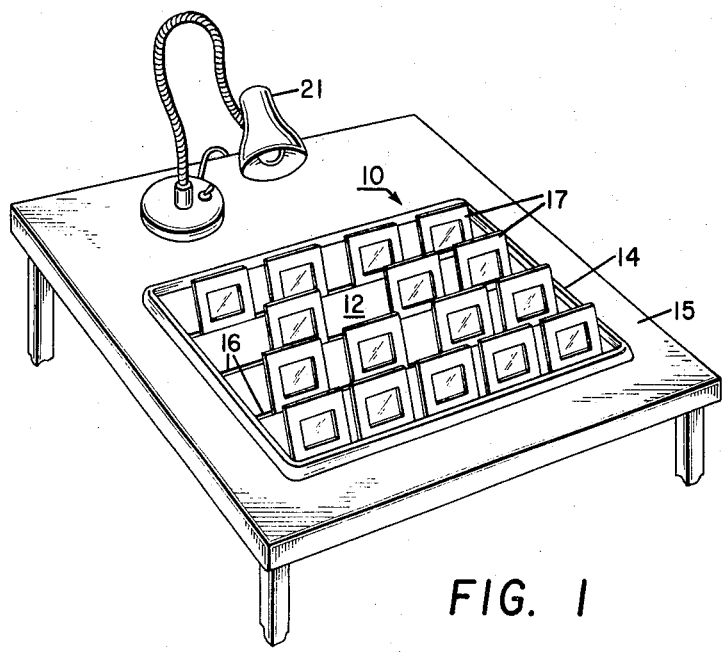
FIG. 1 is a perspective view of the inventive slide holder in use for slide viewing and sorting.
Figure 2:
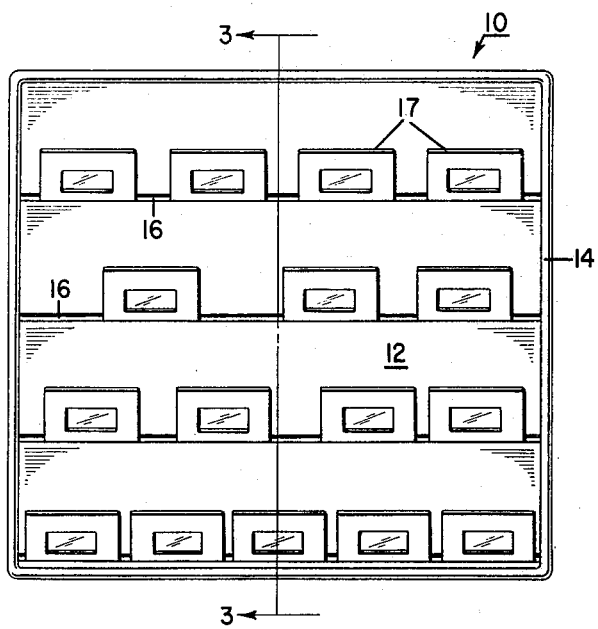
FIG. 2 is a plan view of the slide holder of FIG. 1.
Figure 3:
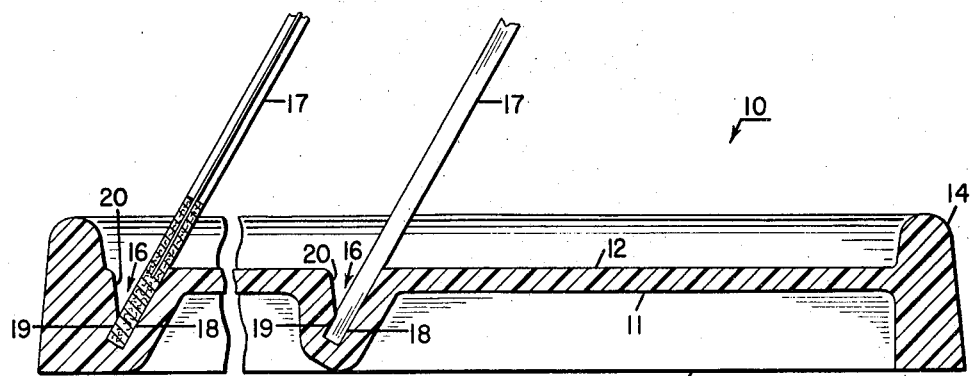
FIG. 3 is a partial cross section of the holder of FIG. 2 taken along the line 3—3 thereof.

Slide holder and sorter 10 as shown in FIGS. 1–3 is preferably formed as an integral unit of molded plastic material. Such material, or at least the upper surface of holder 10, is bright white and highly reflects light diffusely. A preferred material is white polystyrene molded so that the upper surface of holder 10 is smooth. Of course, other white materials such as other resins, paper, or cardboard can be used within the spirit of the invention.

Holder 10 is formed of a base 11 that is generally flat, and has an upper surface 12 that is white and reflectant as described above. The lower surface 13 of holder 10 is preferably flat for supporting holder 10 on a flat surface such as table top 15. A ridge 14 extends around the periphery of holder 10 for strength.

Grooves 16 are formed across holder 10 for receiving and holding slide transparencies 17. Confronting parallel walls 18 and 19 adjacent the bottom of each of the grooves 16 are spaced apart by the thickness of slides 17 for snugly receiving the lower edges of slides 17 and holding them in generally up-right positions. Walls 18 and 19 are each planar and parallel, and are each angled away from the perpendicular to base 11 by an acute angle preferably between 15° and 50° so that all the slides 17 uniformly slope away from the person viewing them.

Grooves 16 are preferably wider at their tops than at their bottoms for easy and convenient insertion of slides 17 into grooves 16. This is accomplished in the illustrated embodiment by groove walls 20 communicating with slide gripping walls 19 and extending away from slide supporting walls 18 to open grooves 16 at their tops.

The lateral spacing of parallel grooves 16 is preferably wide enough so that each transparency is completely backed up by reflecting surface 12 at a convenient viewing angle. Such spacing is preferably approximately equal to the height of slides 17.

With slides 17 set in holder 10 as best shown in FIG. 1, light from lamp 21 is diffusely reflected from white surface 12 and through slides 17 to produce a bright white background enabling slides 17 to be conveniently viewed and sorted. A person sitting on the opposite side of holder 10 from lamp 21 can manually slip slides 17 into and out of grooves 16 as desired in viewing and sorting, and can easily examine all of the slides 17 by reflected light from lamp 21. A lamp is not necessary for viewing slides in holder 10 if sun light or ambient room light from any source casts sufficient light on white surface 12. The inventive holder can be used in many normal room light situations to save the expense and inconveniences of a built-in light source. Furthermore, holder 10 is economically made as a single piece molded article less expensive and less complex than prior art holders and viewers. Holder 10 is also light weight, portable, rugged, serviceable, and convenient.

Figure 4:
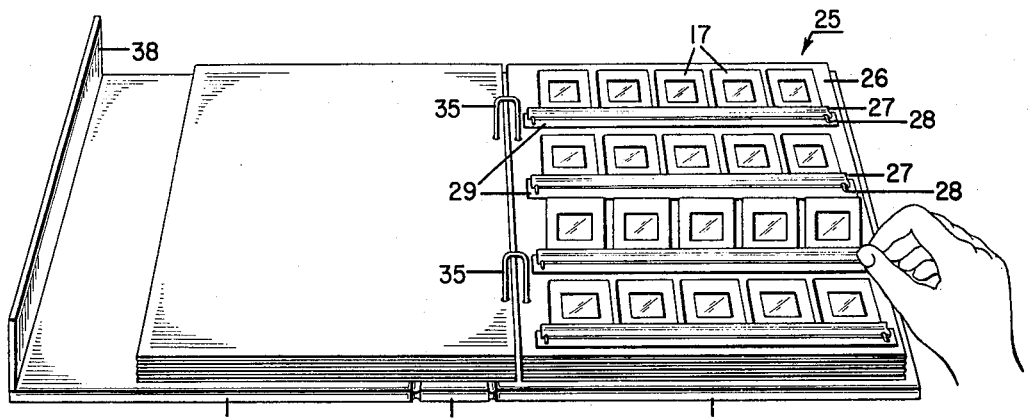
FIG. 4 is a perspective view of another embodiment of the inventive slide holder.
Figure 5:
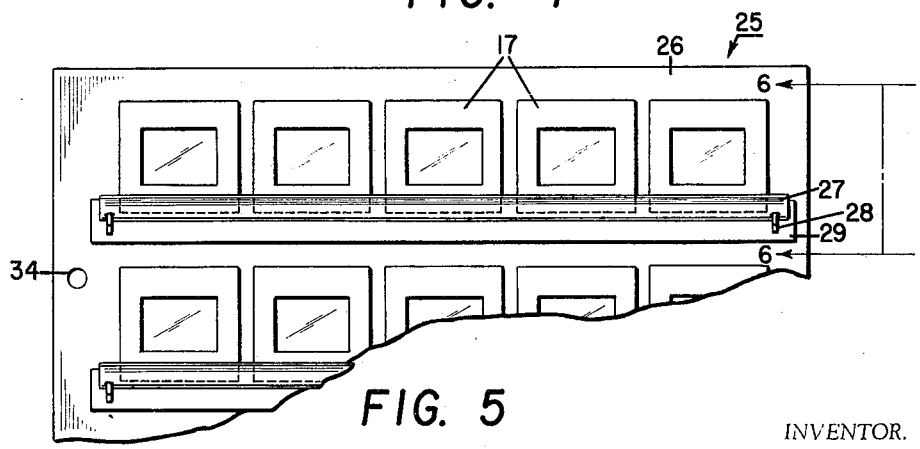
FIG. 5 is a partial plan view of the slide holder of FIG. 4.
Figure 6:
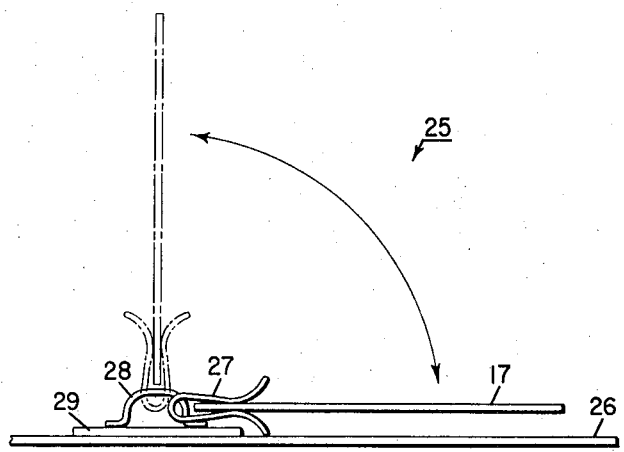
FIG. 6 is a partial cross section of the slide holder of FIG. 5 taken along the line 6—6 thereof.

The basic concept of a slide holder as shown in FIGS. 1–3 can be used as a holder that also serves as a storage album. One such embodiment of the inventive holder or album 25 is shown in FIGS. 4–6. Base 26 for album 25 is preferably a flat white sheet of plastic or heavy paper having a highly reflective upper surface such as described above. Groove members 27, preferably formed of extruded plastic are mounted across base sheet 26 in spaced apart, parallel arrangement. Members 27 are preferably resilient and shaped in cross section as best shown in FIG. 6 to provide a slide retaining groove opening at the top for easy insertion of slides into member 7.

The ends of member 27 are perforated, and rings 28 extend through the perforations to secure members 27 to base strips 29 which in turn are secured to base sheet 26. Rings 28 allow pivotal motion of groove members 27 and slides 17 as best shown in FIG. 6 between an upright position appropriate for viewing slides 17 by reflected light from the upper surface of base 26 and a position closely parallel over base 26 for flat storage of slides 17.

Figure 7:
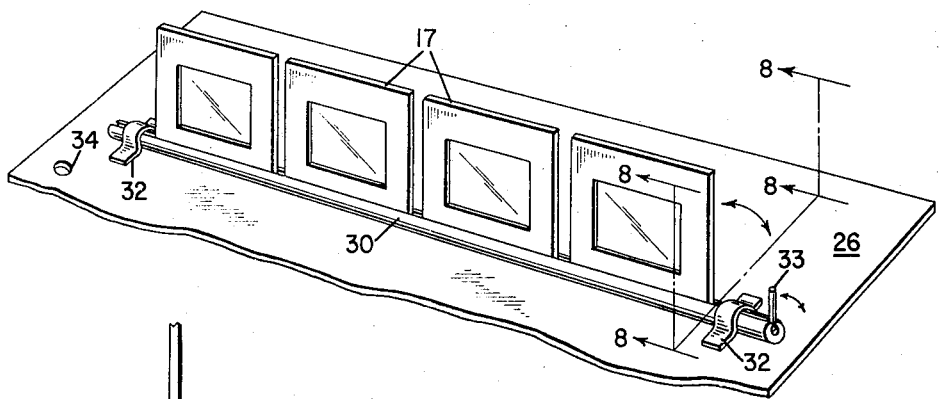
FIG. 7 is a partial perspective view of an alternative groove member for a slide holder of the general type shown in FIG. 4.
Figure 8:
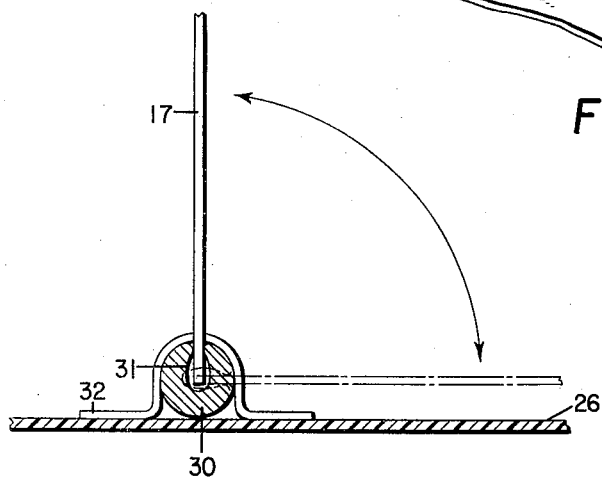
FIG. 8 is a partial cross section of the slide holder of FIG. 7 taken in the direction of the arrows 8 thereon.

An alternative hinging arrangement for raising and lowering slides 17 above base 26 is shown in FIGS. 7 and 8. A cylinder 30 is formed with a groove 31 the walls of which are preferably resilient for snugly receiving and supporting slides 17. Cylinder 30 is held against the upper surface of base 26 by support straps 32 curving over cylinder 30 and secured to base 26. A handle 33 is inserted in the end of slat 31 for gripping by a person manually pivoting slides 17 up and down as desired. With such an arrangement, slides 17 can be elevated for viewing as shown in FIG. 8 or lowered to a position parallel with base 26 for flat storage.

Many other arrangements for hinging or pivoting of groove members such as members 27 and 30 are possible within the spirit of the invention. Stops can be arranged for limiting the upward pivoting of slides 17 to the desired viewing angle, and interference can be provided in a hinging arrangement so as to maintain slides 17 in any generally upright position to which they are manually turned.

Slide holding, grooved members such as members 27 and 30 are preferably set parallel across the upper surface of base 26 and spaced apart sufficiently to allow flat storage of slides 17 between adjacent grooved members. The upper surface of base 26 adjacent each grooved member 27 or 30 is available for hand written information. Base 26 is preferably provided with ring holes 34 so that a plurality of bases 26 can be secured like pages on releasable rings 35 between covers 36 to form a complete album. Preferably a stiff back plate 37 separates covers 36 at the back of the album, and rings 35 also extend across the desired spacing between the covers 36 at the back of the album. A spacer 38 is also preferably provided along the front edge of one of the covers 36 to separate covers 36 by a predetermined amount along the opening edge of the album. Such spacing means keep covers 36 apart and prevent crushing of the slides or their supports.

Album 25 can be used in the same way as sorter 10 by turning grooved members 27 or 30 to elevate rows of slides to a viewing position. Reflected light from the upper surface of base 26 illuminates elevated slides for viewing or sorting as previously described. Slides can be readily inserted or removed from their grooved holders for rearrangement and can then be turned flat against base leaves 26, and the album can be closed for storage.

Other features, advantages, and other specific embodiments of this invention will be apparent to those exercising ordinary skill in the pertinent art after considering the foregoing disclosure. In this regard, while a specific preferred embodiment has been described in detail, such disclosure is intended as illustrative, rather than limiting, and other embodiments, variations, and modifications can be effected within the spirit and scope of the invention as disclosed and claimed. Furthermore, the following claimed subject matter is intended to cover fully all the aspects of the disclosed invention that are unobvious over prior art, including all equivalent embodiments.

I claim:
1. A slide holder comprising:
   (a) a base;
   (b) the upper surface of said base being formed of a bright, white material that diffusely reflects light;
   (c) said upper surface of said base being configured to define a plurality of parallel, spaced-apart grooves extending across said base;
   (d) said grooves having confronting, parallel walls spaced apart by the thickness of said slides for holding said slides in said grooves;
   (e) said confronting walls being recessed below said upper surface;
   (f) said confronting walls being integral with said upper surface; and
   (g) each of said confronting walls being planar and oriented at a uniform acute angle from the perpendicular to the general plane of said base.
2. The slide holder of claim 1 wherein said upper surface of said base is generally flat and said base is configured for resting on a flat surface.
3. The slide holder of claim 2 wherein said base is formed as an integral grooved unit of a molded resin.
4. The slide holder of claim 3 wherein said base includes an integral ridge around its periphery.
5. The slide holder of claim 1 wherein said acute angle is between 15° and 50° from the perpendicular to the general plane of said base.
6. The slide holder of claim 1 wherein said grooves are configured to be wider at their tops than at their bottoms, and said confronting walls are disposed adjacent the bottoms of said grooves.
7. The slide holder of claim 1 wherein said grooves are laterally spaced apart by approximately the height of said slides.
8. A slide holder comprising:
   (a) hinged covers;
   (b) a plurality of bases formed as flat sheets of material;
   (c) ring means for removably securing said bases between said covers;
   (d) the upper surfaces of said bases being formed of a bright, white material that diffusely reflects light;
   (e) grooved members arranged on said bases to define a plurality of parallel, spaced-apart grooves extending across said bases;
   (f) said grooves having confronting, planar, parallel walls spaced apart by the thickness of said slides for holding said slides in said grooves;
   (g) said grooved members being mounted for pivotal motion relative to said bases for moving said slides between a position parallel with said bases for storage and position in which said confronting walls are oriented at acute angles from the perpendicular to the general plane of said base.
9. The slide holder of claim 8 including spacer means for separating said covers by a predetermined amount.

References Cited

UNITED STATES PATENTS

| | | | |
|---|---|---|---|
| 1,345,365 | 7/1920 | Hutchison | 129—20 |
| 1,466,038 | 8/1923 | Brubaker | 40—106.1 X |
| 2,147,773 | 2/1939 | Larson. | |
| 2,227,898 | 1/1941 | Grant | 40—106.1 X |
| 2,284,031 | 5/1942 | Arnold et al. | 129—20 |
| 3,200,523 | 8/1965 | Zagel | 40—106.1 |
| 3,410,012 | 11/1968 | Kumei et al. | 40—106.1 |

FOREIGN PATENTS

| | | |
|---|---|---|
| 1,010,965 | 4/1952 | France. |
| 1,156,578 | 10/1963 | Germany. |

EUGENE R. CAPOZIO, Primary Examiner

R. CARTER, Assistant Examiner

U.S. Cl. X.R.

40—104.02